United States Patent
Regni et al.

(10) Patent No.: US 12,346,196 B2
(45) Date of Patent: Jul. 1, 2025

(54) EXTENDED PROTECTION STORAGE SYSTEM PUT OPERATION

(71) Applicant: SCALITY, S.A., Paris (FR)

(72) Inventors: Giorgio Regni, Albany, CA (US); Lam Pham Sy, Issy-les-Moulineaux (FR); Benoit Artuso, Hadol (FR); Frederic Ferrandis, Saint Leu la Foret (FR); Vianney Rancurel, Sausalito, CA (US)

(73) Assignee: Scality, S.A., Paris (FR)

( * ) Notice: Subject to any disclaimer, the term of this patent is extended or adjusted under 35 U.S.C. 154(b) by 115 days.

(21) Appl. No.: 17/960,129

(22) Filed: Oct. 4, 2022

(65) Prior Publication Data

US 2024/0111623 A1  Apr. 4, 2024

(51) Int. Cl.
*G06F 11/10* (2006.01)
*G06F 11/07* (2006.01)

(52) U.S. Cl.
CPC ........ *G06F 11/0793* (2013.01); *G06F 11/073* (2013.01); *G06F 11/1076* (2013.01)

(58) Field of Classification Search
CPC ............. G06F 11/1092; G06F 11/1088; G06F 11/108; G06F 11/1076; G06F 11/2048; G06F 11/10; G06F 11/08; G06F 3/0683–0689
See application file for complete search history.

(56) References Cited

U.S. PATENT DOCUMENTS

| | | | | |
|---|---|---|---|---|
| 7,434,091 | B1* | 10/2008 | Karr | G06F 3/0683 711/114 |
| 2006/0117216 | A1* | 6/2006 | Ikeuchi | G06F 11/1662 714/6.2 |
| 2009/0327803 | A1* | 12/2009 | Fukutomi | G06F 11/108 714/E11.085 |
| 2014/0025990 | A1* | 1/2014 | Akutsu | G06F 3/0689 714/6.22 |
| 2015/0149819 | A1* | 5/2015 | Lee | G06F 11/1076 714/6.24 |
| 2015/0363419 | A1 | 12/2015 | Chennamsetty et al. | |
| 2016/0139980 | A1 | 5/2016 | Cowling et al. | |
| 2016/0239229 | A1 | 8/2016 | Krishnaprasad et al. | |
| 2017/0308437 | A1 | 10/2017 | Usvyatsky et al. | |
| 2019/0196910 | A1* | 6/2019 | Gu | G06F 11/1088 |
| 2020/0042390 | A1* | 2/2020 | Roberts | G06F 11/1092 |
| 2021/0349781 | A1 | 11/2021 | Ki et al. | |
| 2022/0253355 | A1* | 8/2022 | Resch | G06F 11/2094 |
| 2022/0357881 | A1* | 11/2022 | Nehse | G06F 3/0617 |

OTHER PUBLICATIONS

International Search Report and Written Opinion for PCT Patent Application No. PCT/US23/34458, Mailed Feb. 1, 2024, 9 pages.

* cited by examiner

*Primary Examiner* — Yolanda L Wilson
(74) *Attorney, Agent, or Firm* — Compass IP Law PC

(57) ABSTRACT

A method is described. The method includes executing a PUT operation for an object including attempting to store the object's data and first protection information into S storage devices and attempting to store second protection information into one or more R additional storage devices. The method includes determining that at least one write attempt into the S storage devices was not successful. The method includes repairing the object's stored state by causing the object's data and first protection information to be stored into the S storage devices.

21 Claims, 15 Drawing Sheets

| Objects | | Servers | | | |
|---|---|---|---|---|---|
| Name | State | 1 | 2 | 3 | 4 |
| A | abnormally protected | $d_1$ | | $p_1$ | |
| B | abnormally protected | $d_1$ | | $p_1$ | $e_1$ |
| C | abnormally protected | $d_1$ | $d_2$ | $p_1$ | |
| D | abnormally protected. | $d_1$ | $d_2$ | $p_1$ | $e_1$ |

Columns 1–3 are grouped under S; column 4 is grouped under R. Column 2 is marked with X.

Fig. 7b

EXTENDED PROTECTION STORAGE SYSTEM PUT OPERATION

FIELD OF INVENTION

The field of invention pertains generally to the computing sciences, and, more specifically, to an extended protection storage system PUT operation.

BACKGROUND

With the emergence of "big data" computing, more and more applications are seeking faster access to mass storage, while, at the same time, preserving data integrity.

FIGURES

Figure 1:
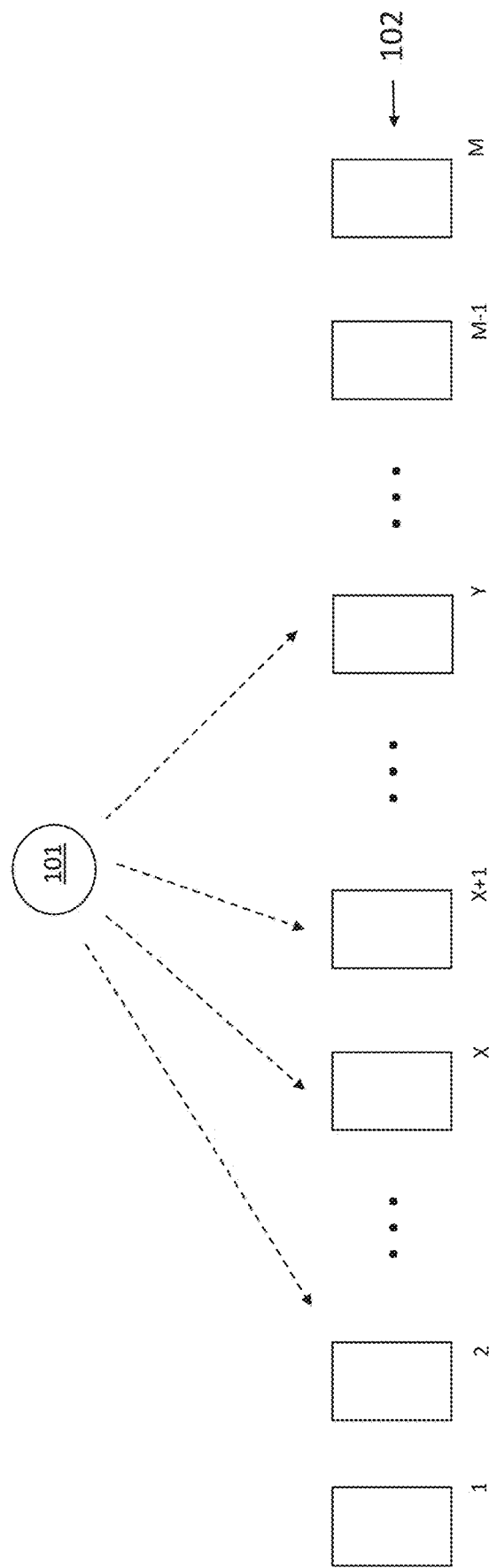
Figure 2:
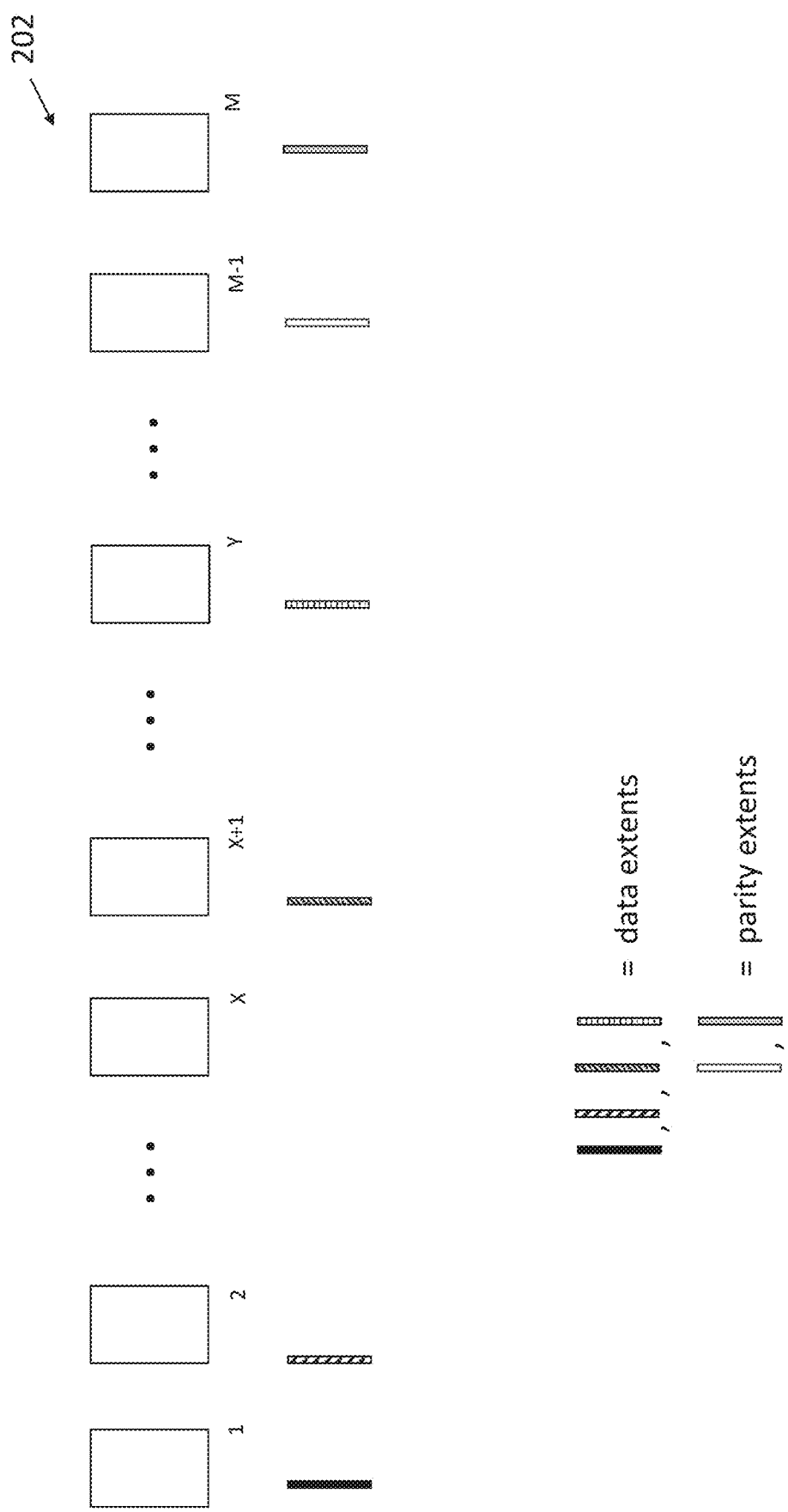
Figure 3:
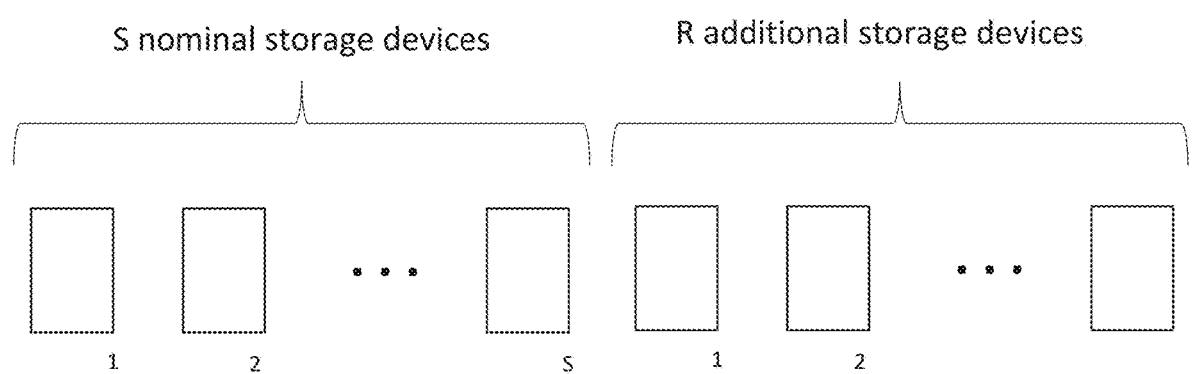
Figure 4A:
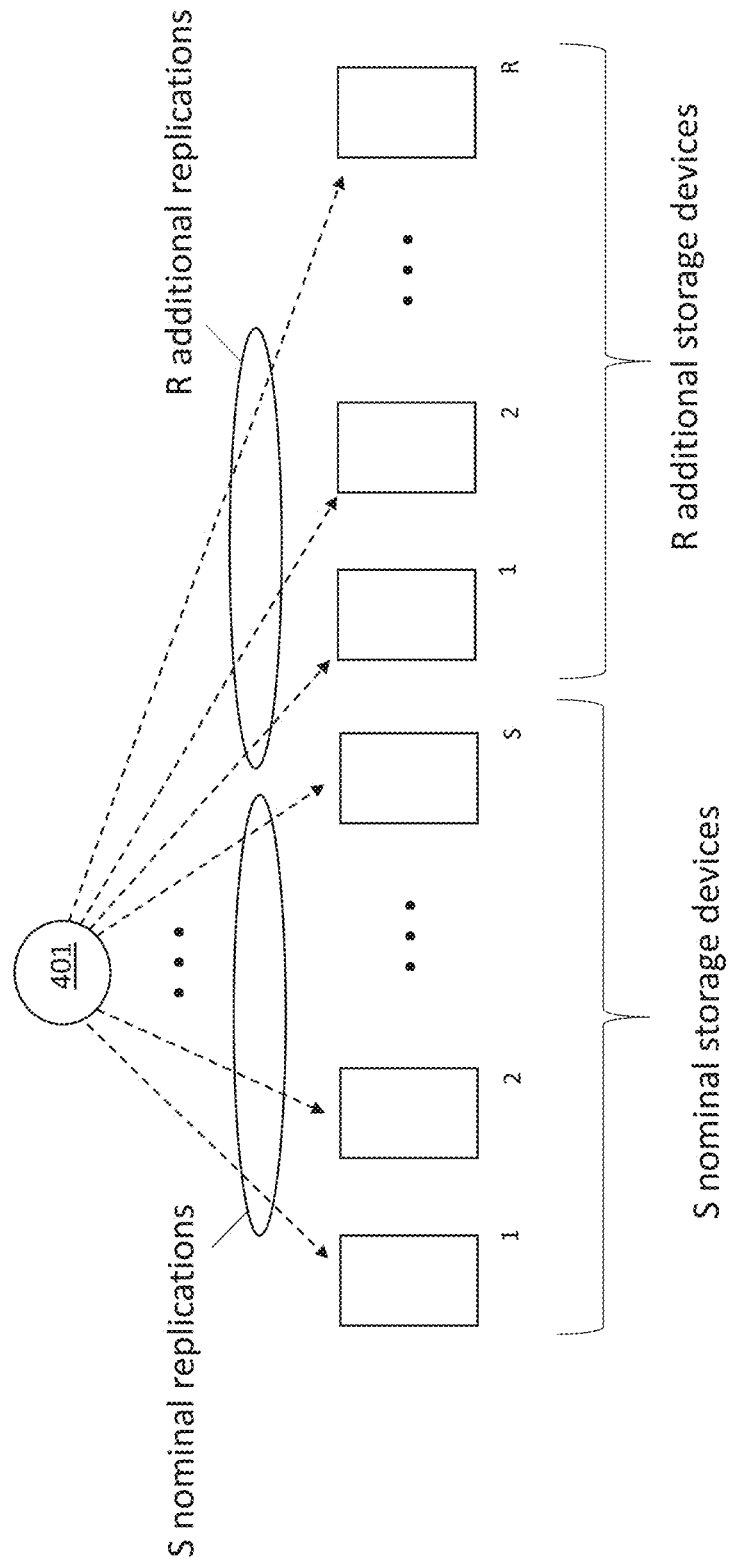
Figure 4B:
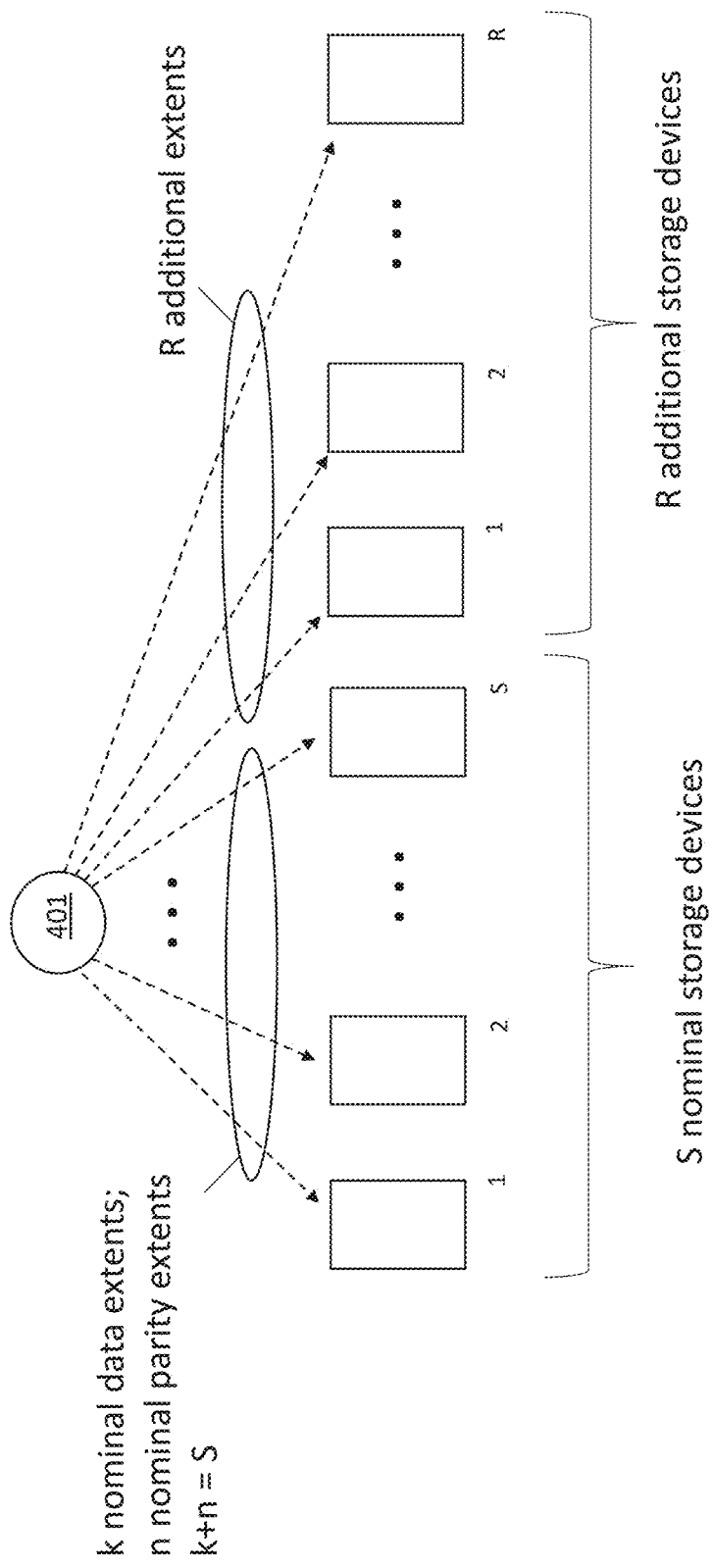

FIG. 1 depicts replication protection;
FIG. 2 depicts erasure encoding protection;
FIG. 3 shows storage devices for an enhanced protection PUT operation;
FIGS. 4a and 4b depicts enhanced protection PUT operations;
FIGS. 5a, 5b, 5c, and 5d show different resultant states of an enhanced protection PUT operation;
FIG. 6 shows a method flow of an enhanced protection PUT operation;
FIGS. 7a, 7b, 7c and 7d depict an example of an enhanced protection PUT operation;
FIG. 8 depicts a computer system.

DETAILED DESCRIPTION

Mass storage systems are measured, in part, by their reliability. Here, there is some probability that the underlying physical storage devices (e.g., hard disk drives (HDDs), solid state drives (SSDs) that are actually storing customer/user information will fail. As such, mass storage systems are often designed with certain features that prevent loss of data even if there is a failure of the physical device(s) that store the data.

FIG. 1 depicts a first reliability technique, referred to as replication. In the case of replication, for instance in the case where an object 101 is being stored into a mass storage system containing M multiple storage devices 102, the object is replicated some number of times and each different instance of the object is stored in one or more different physical storage device(s). As such, if one of the devices fails, there are still additional copies of the object in the storage system. In the basic example of FIG. 1, the object being stored 101 is replicated four times and stored in storage devices 2, X, X+1 and Y.

Another technique is erasure coding. In the case of erasure coding, referring to FIG. 2, user/customer data is protected with parity information. Here, one or more objects that are to be stored into the storage system are broken down into k separate units of data, referred to as data extents, and the k different data extents are stored on different physical storage devices. The data content of the k data extents are also processed by a mathematical algorithm which generates n parity extents. The n parity extents are then stored in additional different physical storage devices such that each of the k+n extents are stored in a different physical storage device. That is, k+n different physical storage devices are used to store the k data extents and the n parity extents.

If up to n of any of the k+n storage devices fail, the original k data extents can be recovered by processing the remaining extents with a corresponding mathematical algorithm. FIG. 2 depicts a basic example in which there are four data extents (k=4) and two parity extents (n=2) which form a (4,2) extent group (the two parity extents have been calculated from the four data extents). As observed in FIG. 2, the four data extents are stored in physical storage devices 1, 2, X−1 and Y whereas the two parity extents have been stored in physical storage devices M−1 and M.

Here, if up to two of any of the six physical storage devices (1, 2, X−1, Y, M−1 and M) suffer a failure, the content of the k data extents can be completely recovered by processing the remaining four or five extents (regardless of their data or parity status) with a corresponding mathematical algorithm.

Traditionally, one or the other of replication and erasure coding has been used to protect a particular data item (e.g., object) that is stored in a storage system. Moreover, the total number of replications in the case of replications, or, the k+n total number of extents in an erasure encoded extent group have traditionally been set equal to some number S of working physical storage devices in a storage system. That is, in a mass storage system organized into groups of S working storage devices, in the case of replication, S replications of a data object are created and stored in the S working devices, or, in the case of erasure encoding, k+n=S total extents are created in an extent group and separately stored in the S working devices.

A problem is the one or more of the S working devices can be intermittently available or functional. Here, particularly in the case of large scale storage systems having large numbers of physical storage devices and correspondingly large S, during a PUT operation, it is not uncommon for one or more of the S storage devices to be temporarily unavailable or not functional. A PUT command either writes a new object into the storage system or updates an existing object that is already stored in the storage system with new information. If all S physical storage devices are not currently capable of receiving their respective write information when a particular PUT command is about to be (or is being) executed, the storage system's reliability can become uncertain with respect to the object that is the target of the PUT operation.

In many cases, as suggested above, the uncertainty stems for temporary issues within the storage system rather than hard fails. For example, if the storage systems include large numbers of storage devices interconnected by one or more networks, the temporary lack of functionality of a particular storage device could be a result of network delays. In still other cases, a physical storage device may be temporarily unavailable because it is busy working on other tasks (e.g., a physical storage device in a server is temporarily unavailable because the server is working on tasks other than newly received PUT commands).

Ideally, all S storage devices that are targeted by a PUT command are immediately responsive but, for many PUT commands, they are not immediately responsive because of such intermittent delays in availability/functionality. Such issues are increasingly troublesome for large scale storage systems which have large numbers of storage devices with corresponding network(s) between them, and/or, support replications and/or erasure encoded extent groups into working storage device groups with large S. Delaying formal completion of a PUT command until each of the S targeted storage devices becomes responsive is impractical because write latencies would unfavorably increase.

FIG. 3 pertains an improved approach that adopts the concept of a group of S working (or "nominal") storage devices that store S replications in the case of replication, or, S data and parity extents in a (k,n) erasure encoded extent group (i.e., S=k+n) in the case of erasure encoding. However, the of FIG. 3 adds additional R storage devices as a working "scratchpad" for PUT commands.

Here, during a PUT command, the associated write information is not only sent to the S nominal storage devices but also, additional write information is sent to the additional R storage devices. Provided a sufficient number of the S+R storage devices are (e.g., immediately) responsive, enough information is written into the storage system that any missing information can be recovered through a subsequent repair process. The mass storage system is then free to service a next PUT command rather than wait for any of the S storage devices that were unavailable during execution of the PUT command.

FIG. 4a shows an improved PUT command process for replication whereas FIG. 4b shows an improved PUT command process for erasure encoding. As observed in FIG. 4a, in the case of replication, R additional replications (R≥1) are stored in the additional R storage devices beyond the nominal S replications that are stored in the nominal S storage devices. Here, the additional R storage devices provide additional replication that add further insurance to the reliability of the object being written by the PUT command.

Similarly, as observed in FIG. 4b, in the case of erasure encoding, R additional extents are stored in the additional R storage devices beyond the nominal k data extents and n parity extents stored in the nominal S storage devices. In various embodiments the R additional extents are additional parity extents that effectively increases the value of n (the total number of parity extents in the extent group) by R to give the erasure group additional protection beyond its nominal protection. In alternate or combined embodiments, the R additional extents are composed of additional data extents or a combination of data and parity extents. Again, the additional R storage devices provide additional extents beyond the nominal extent group's extents to provide further insurance to the reliability of the object being written by the PUT command.

FIGS. 5a through 5d depict different possible states in the immediate aftermath of a PUT command operated according to the processes described just above with respect to FIG. 4a or 4b.

Figure 5A:
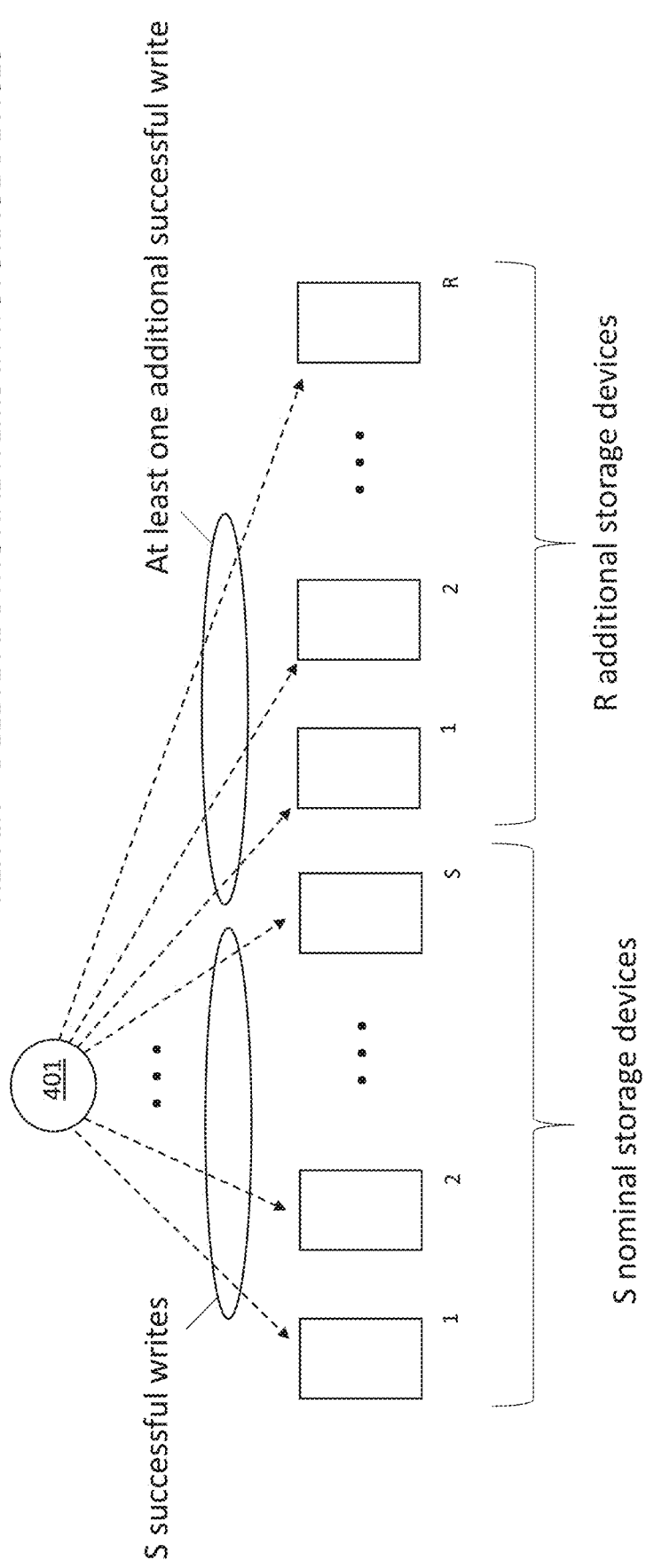
Figure 6:
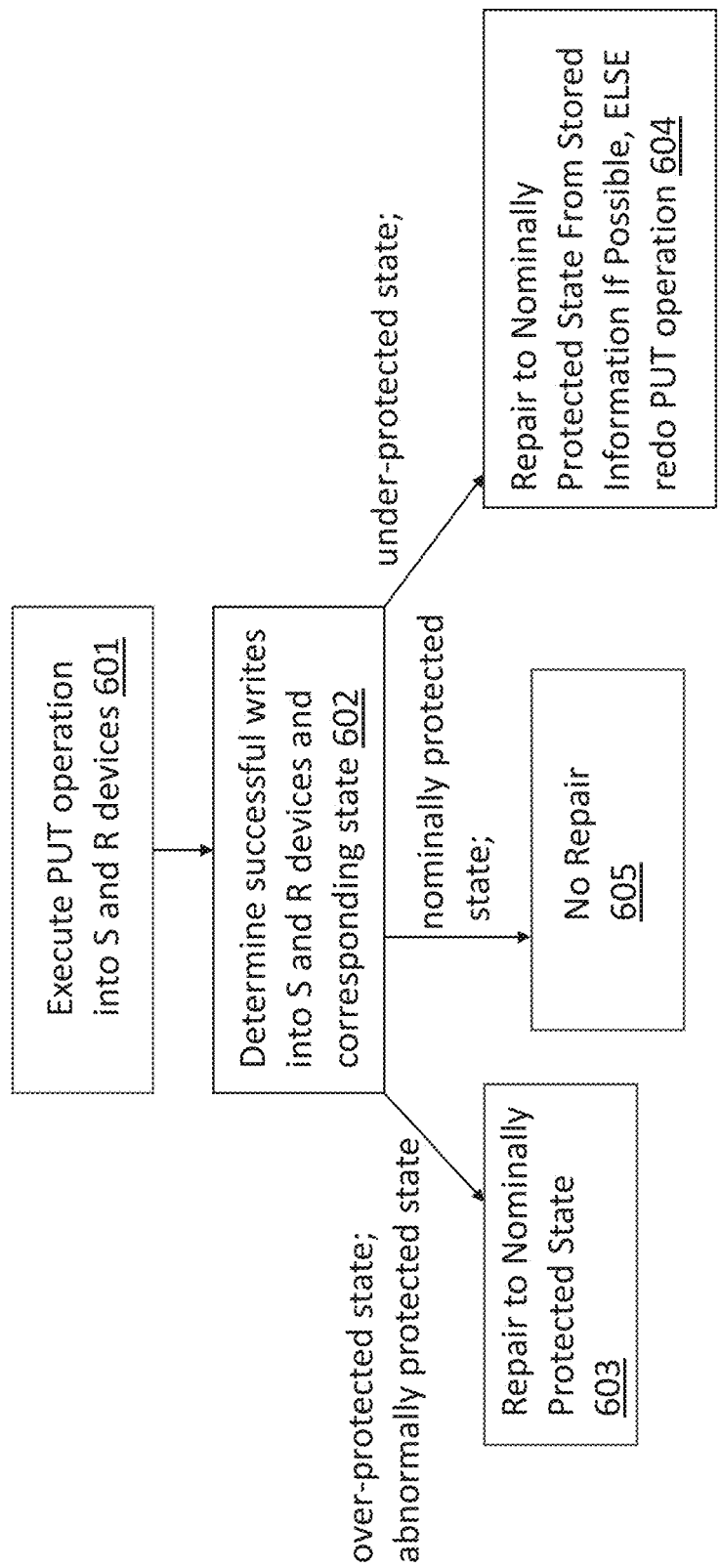

FIG. 5a shows an over protected state in which not only were all S write operations successfully executed into the S nominal storage devices, but also, one or more of the additional write operations into the R additional storage devices were also successfully executed. In this case, because all of the nominal S storage devices were successfully written into, there is no need to keep the additionally written information in the R storage devices. As such, after the PUT operation results in the over protected state of FIG. 5a, a subsequent repair operation deletes the additionally written information in the R storage devices (and/or allows them to be overwritten with some other object's information) resulting in nominal protection as the steady state. In other embodiments the definition of over-protected includes situations were less than all S writes were successfully made into the S storage devices but the total number of writes into the S and R storage devices exceeds S. For ease of explanation the following discussion will assume over-protected means all writes into the S storage devices are successful.

Figure 5B:
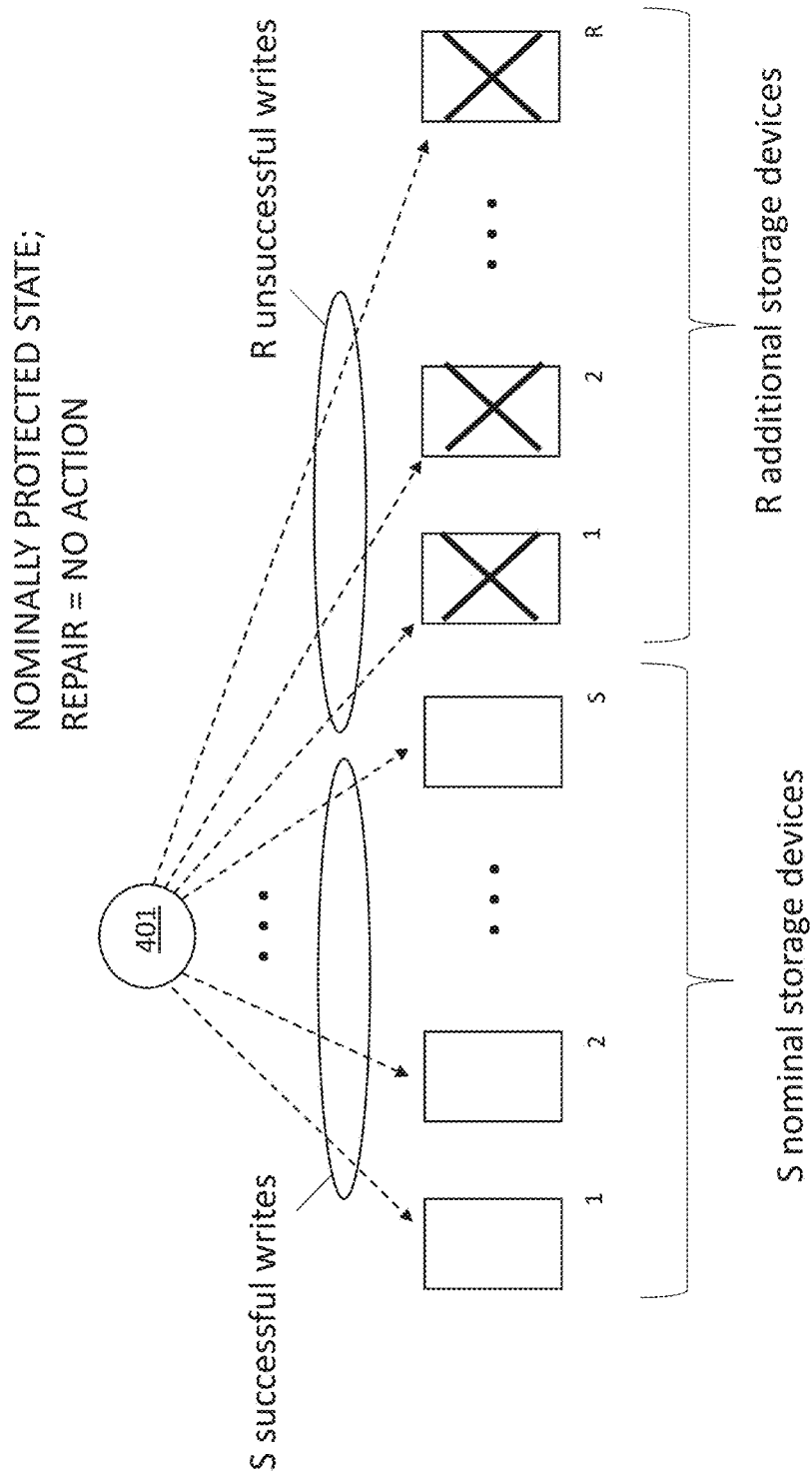

FIG. 5b shows a nominally protected state in which (for whatever reason), all S of the nominal storage devices were successfully written into by the PUT command but none of the additional R storage devices were. Because a proper, nominally protected information set has been written into the storage system, there is no subsequent repair process (the storage system keeps the originally written nominally protected state as the steady state).

Figure 5C:
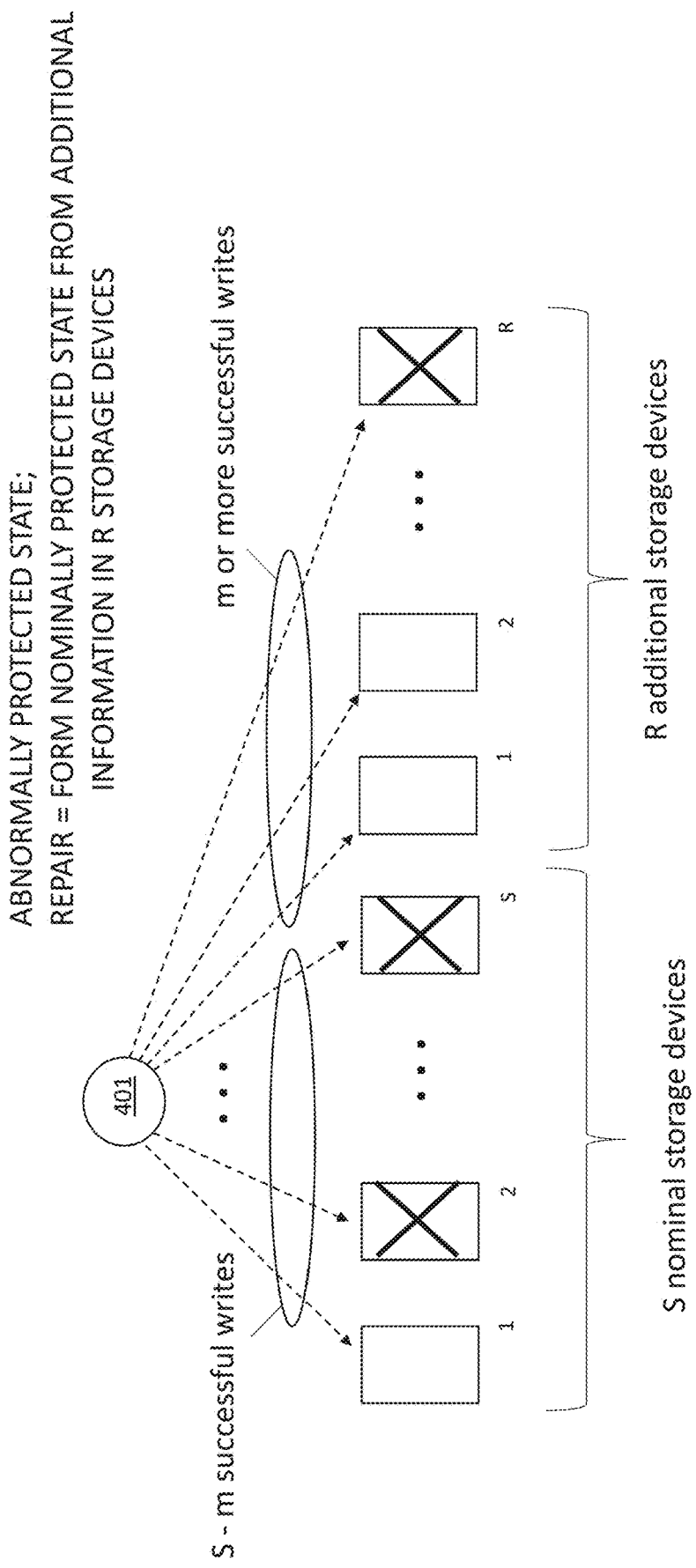

FIG. 5c shows an abnormally protected state. As observed in FIG. 5c, in the case of abnormally protected state, less than all of the nominal S write operations were successful, but, enough of the additional R write operations were successful such that the user write data is deemed protected. The repair operation will subsequently write the missing information into whichever of the S nominal devices did not properly execute the PUT command and then delete the additional information in the additional R devices.

For example, consider a replication scenario which S=4 (the write object is to be written four times into four S devices of the storage system). In this case, the PUT operation of FIG. 4a will attempt to write four replicas into the four nominal S storage devices and one or more additional replicas into the additional R storage devices. The result of the PUT operation will be deemed abnormally protected if one of the writes into the S devices fails and at least one of the writes into the R devices succeeds. In this case, the failed write of a replicant into the S devices is compensated for by the successful write of a replicant into the R devices.

As such, four-wise replication protection is achieved overall after the PUT operation executes, but four-wise protection within the S devices (nominal protection) has not been achieved. The subsequent repair operation will therefore write a replicant into the particular one of the S storage devices that did not execute the PUT command and then delete any/all replicants there were written into the R devices so that the nominal protected state is realized as the steady state. Similar scenarios follow for two failed writes into the S devices and at least two successful writes into the R devices, three failed writes into the S devices and at least three successful writes into the R devices, etc.

Consider another example is which protection is achieved with a k=3, n=1 erasure encoding scheme. We apply the (3, R+1) erasure coding scheme on generating parity extents. Here, there are S=4 nominal storage devices where three of the nominal S devices store a data extent and one of the nominal S devices stores a parity extent. One or more R additional storage devices would store additional parity extents and/or data extents. According to the definition of an erasure encoding scheme, up to n extents can be lost in the k+n extent group before the data in the k data extents cannot be recovered. Thus, with a k=3, n=1 erasure encoding scheme, the information in the k=3 data extents can be recovered if one extent is missing.

If the initial write operation results in one of the k+n=3+1=4 extents not being successfully written into the nominal S devices and at least one additional parity extent (or the extent (data or parity) that is missing in the S devices) being successfully written into the additional R devices, the data is deemed abnormally protected because nominal protection has not been achieved (k data extents and n parity extents were not successfully written into the S devices), but, a total of k+n extents or more were successfully written into the storage system as a whole when the additional extent(s) that were successfully written into the additional R storage devices are considered.

During the repair process, if the extent that failed to write into the S devices was a data extent, the data extent can be recovered, e.g., by processing the extents that were successfully written with the erasure coding algorithm. The data extent is then stored into the S device that was not successfully written into. If the extent that failed to write into the S devices was a parity extent, the k data and/or parity extents are read from the S and R devices and processed to generate a new parity extent. The new parity extent is then stored into the S device that was not successfully written into. Alternative to these processes, if the missing extent in the S devices is replicated in one of the R devices it can be directly moved from the R device to the S device that it was not successfully written to. After the repair process, the nominally protected group of k=3 data and n=1 parity extents are stored in the S=4 nominal storage devices.

Figure 5D:
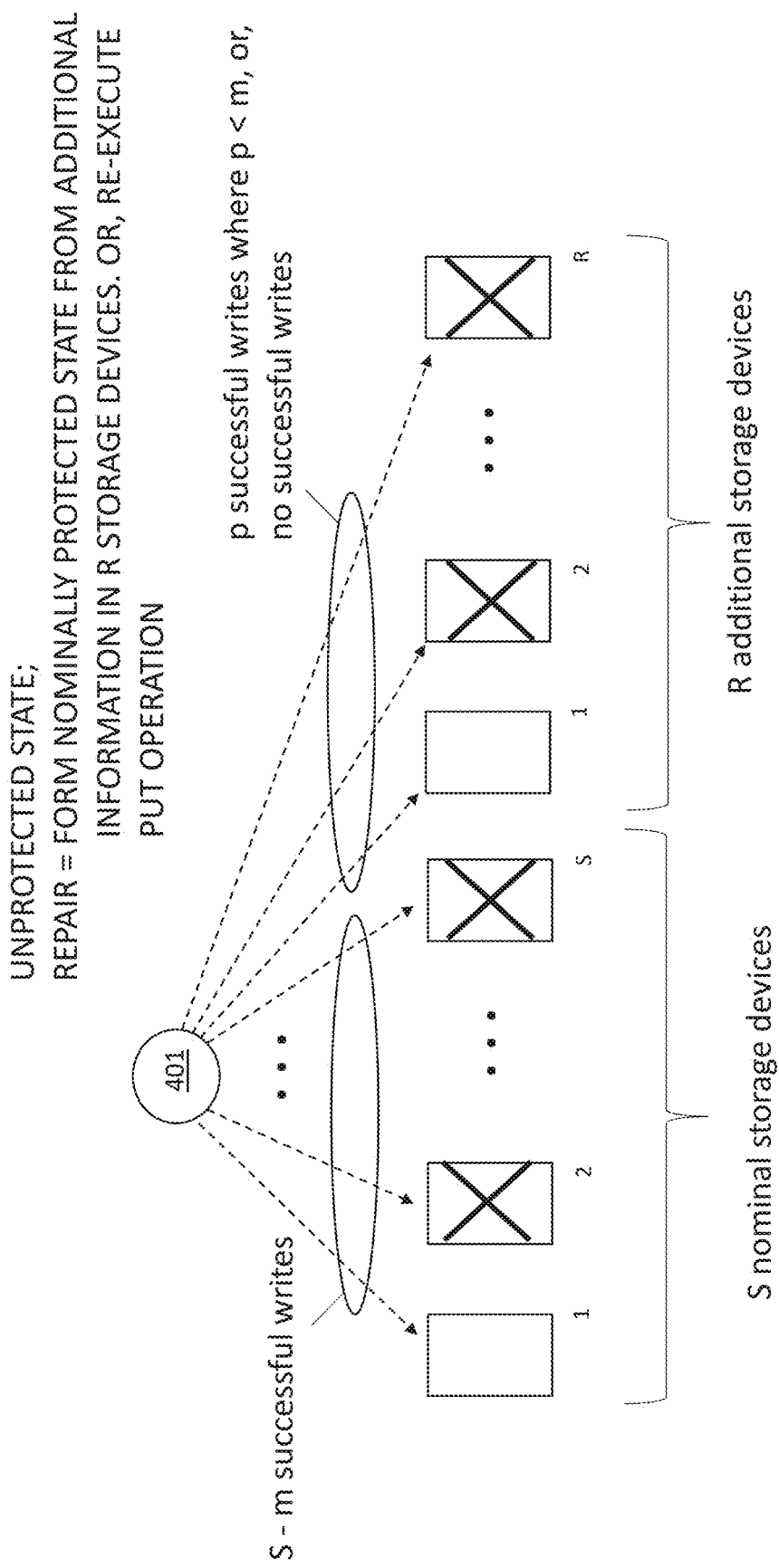

FIG. 5d shows an unprotected state. In the case of an unprotected state, the user data is not protected when the successful writes into the nominal S devices and the additional R storage devices are considered as a whole. For example, considering again an example where there is to be four-wise (S=4) replication, the resultant state of the PUT operation will be unprotected if only one, two or three successful writes are executed into the S and R devices combined. In this case, the repair operation will write replications into the nominal S devices until each of the S devices have been written into with a replication so that the nominally protected state is reached.

In the case of a k=3, n=1 erasure coding approach, the resultant state of the PUT operation will be unprotected if less than four extents are written into the S and R devices combined. The repair process will depend on the information that was successfully written. Some repair processes can create the missing information from the information that was stored. For example, if all k=3 data extents were successfully written into the S devices but no parity extents were successfully written into either of the S and R devices, the missing parity extent can be calculated from the successfully written data extents (re-execution of the erasure coding algorithm on the stored data extents). The generated parity extent is then stored in the S device that failed to store the parity extent during the original execution of the PUT command. In the case of replication, as many replications as needed can be stored in the S devices so long as at least one replication was written into the S and R devices.

In still other cases, the entire PUT operation is re-executed (e.g., in the case of a k=3, n=1 erasure coding approach where less than k total extents (including data and parity extents) were successfully written into the S and R devices).

FIG. 6 shows a PUT operation sequence using the principles described above. As observed in FIG. 6, a PUT operation is initially performed 601 that includes S writes into S nominal storage devices and R additional write attempts into R additional storage devices.

A determination of the state of the storage system after the PUT operation is then made 602 based on which of the aforementioned S and R writes were successful. If the resulting state corresponds to an over-protected or abnormally protected state, the information is repaired 603 to a nominally protected state in the S nominal devices. If the resulting state corresponds to an under-protected state, the stored information is used to repair the state to a nominally protected state in the S devices, or, the PUT operation is re-executed 604. If the resultant state corresponds to a nominally protected state no repair is performed 605.

Thus, importantly, so long as the result after the initial S and R writes does not result in the PUT operation having to be reperformed, the system can deem the PUT operation to be committed (successful) and move on to a next PUT operation (knowing the subsequent repair operation, if appropriate) will ultimately transform the written information to the nominally protected state. Thus, PUT operations can be performed sequentially even if certain physical storage devices are unavailable at the time each of the PUT operations are executed. Moreover, the additional R storage resources are only utilized temporarily for each PUT operation and do not therefor reflect a total cost of storage of R additional storage devices per stored object.

FIGS. 7a through 7d explore additional complications associated with storage device intermittent failure in between the initial write and the completion of the repair process and additional characteristics of parity protected objects.

Figure 7A:
Figure 8:
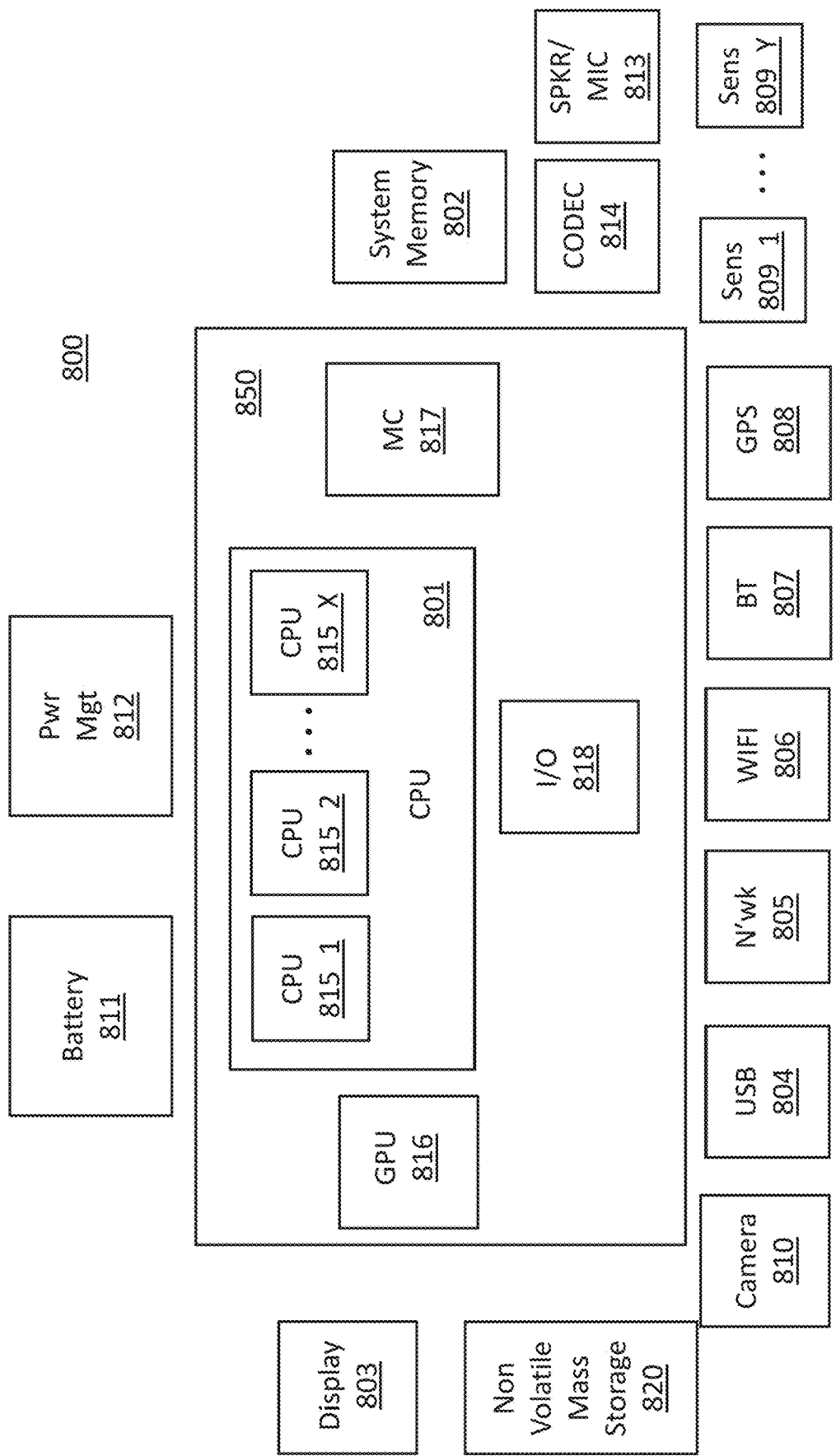

FIG. 7a shows an initial state of four objects A, B, C and D after their respective PUT operations. Here, each of the objects are to be protected with a (k=2, n=1) erasure encoding scheme in their nominal state. As such, S=3 and the protected erasure group in the nominal state includes a pair of data extents d1, d2 and a single parity extent p1. Thus, in the steady state under nominal protection the stored information can recover the loss of any one of the d1, d2 and p1 extents by processing the survivors with the erasure coding algorithm.

During the initial PUT operation, however, an additional parity element e1 is calculated and stored in a single, additional R storage device. As such, during the interim before the nominal, final state is reached, the written information is protected by a (k=2, n=2) erasure coding scheme, meaning, full recovery can be reached from the loss of any two of the pair of data extents (d1, d2) and the pair of parity extents (p1, e1). Thus, additional protection is provided by the additional R device.

As observed in FIG. 7a, objects A and B are abnormally protected. Neither reflects nominal protection because at least one extent is missing from the S storage devices. However, because a (2,2) erasure coding scheme is applied during the PUT operation, the system can recover if up to two extents are not successfully written. In the case of object A two extents were not successfully written (in storage devices 2 and 4). In the case of object B one extent was not successfully written (in storage device 2). Thus, because no more than two extents are missing from the protect group for either object, the nominal state can eventually be recovered from the information that was successfully written.

Object C is nominally protected (all writes into S were successful and no writes into R where successful) and object D is over protected (all writes into S were successful and the write into R was successful).

FIG. 7b shows the system of FIG. 7a but after storage device 2 is deemed to be a failure rather than intermittently unavailable. The failure of storage device 2 causes the states of both objects C and D to change from their respective state in FIG. 7a to the abnormally protected state.

Figure 7C:
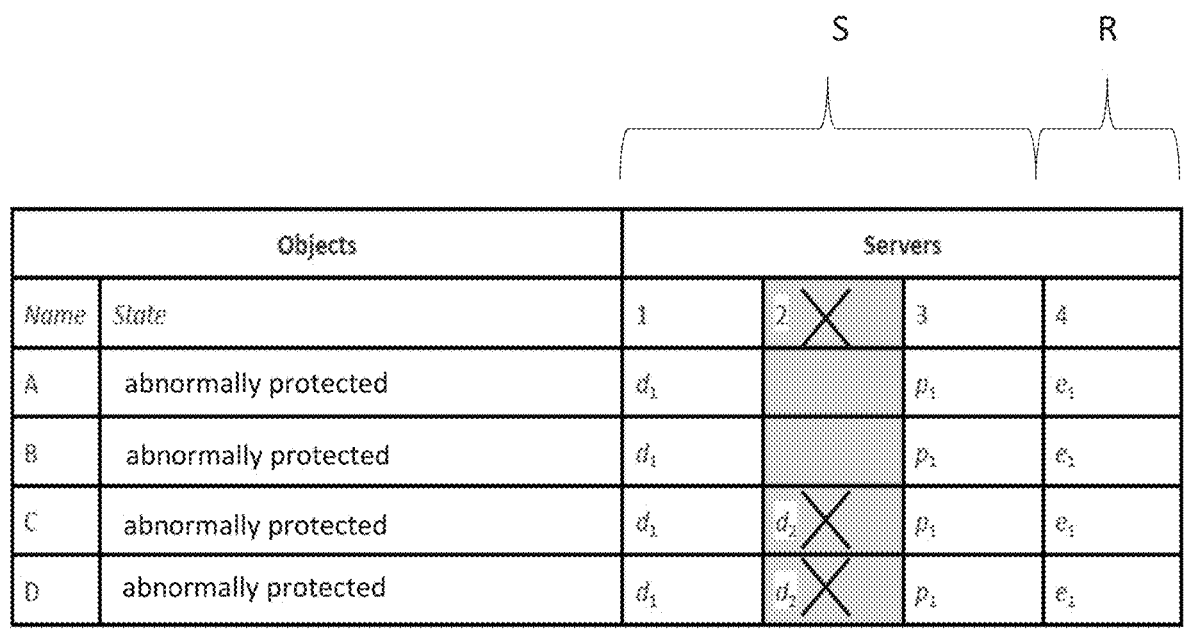

FIG. 7c shows the system after the additional parity extent e1 is calculated for each of the abnormally protected objects (objects A and C) that do not have a successfully stored e1 extent. The additional parity extent e1 can be calculated for each of objects A and C from the partial information that is stored for each of them as observed in FIG. 7b. The missing data extent d2 can also be calculated for object A but cannot be stored into device 2 because it is failed.

Here, the writing of the missing e1 extent for objects A and C essentially serves as an attempt by the system to "fix" any missing information in the R storage devices before moving on to formal repair processes. That is, the purpose of the R storage devices is to store additional protection information beyond nominal protection to handle possible storage devices problems from the execution of the PUT operation to the time the nominally protected state is reached. Thus, the writing of the additional parity extent e1 for objects A and C is an attempt to provide the additional protection in R for these objects before moving on to repair.

Figure 7D:
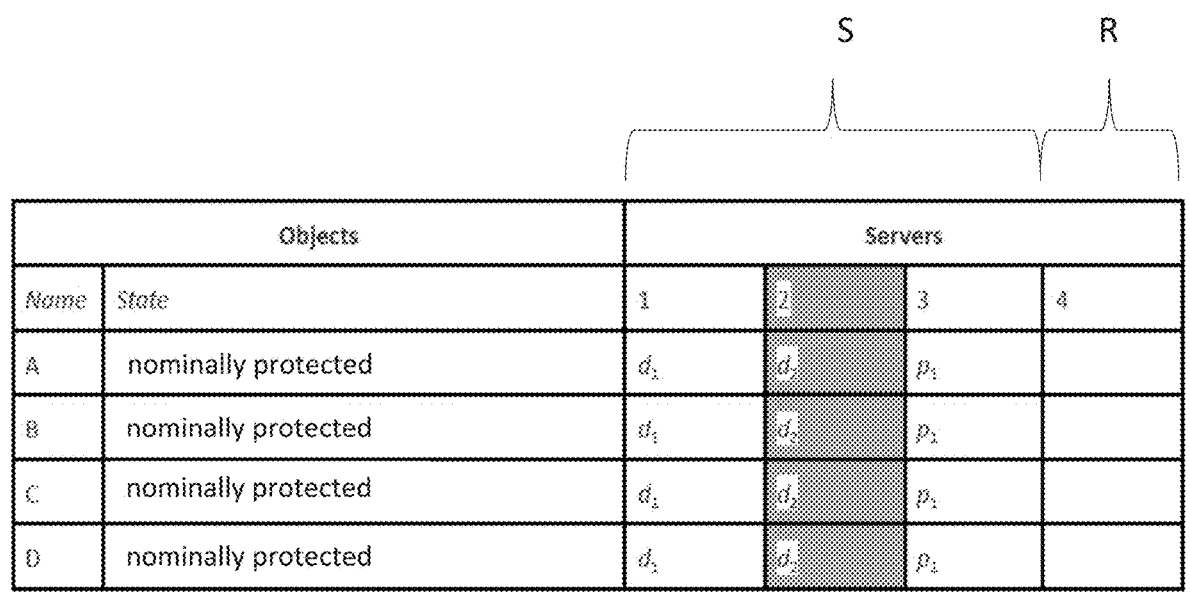

FIG. 7d shows the system after the repair process has been executed for objects A, B, C and D after storage device 2 becomes functional resulting in each of them being in the nominally protected state.

In various embodiments, as alluded to above, the storage system is an object storage system. As is known in the art, in the case of object storage systems, units of stored information ("objects") are identified with unique identifiers ("object IDs"). Thus, whereas a traditional file system identifies a targeted stored item with a path that flows through a directory hierarchy ("filepath") to the item, by contrast, in the case of object storage systems, targeted stored items are identified with a unique ID for the object.

In various other embodiments the storage system that implements the teachings above is a file storage system. Here, for ease of interpretation the term "object" is meant to embrace an object in an object storage system as well as a file in a file storage system.

The PUT operation with extended temporary protection and repair operations as described above can be performed in a centralized manner (e.g., as a component of an architectural focal point of storage system operation and control). For example, a storage system may have a centralized controller or centralized control function that acts as a front end of the storage system to process incoming PUT and GET commands. Depending on the size/scale of the storage system, the centralized control can be implemented, e.g., within a storage device, within a storage server, or across a cluster of computers that act as front end for a large scale storage system.

In other implementations the extended temporary protection and repair operations as described above can be performed in a decentralized/distributed manner, e.g., across the storage system's storage devices. In other implementations some combination of distributed and centralized operations can be performed to implement the extended temporary protection and repair operation processes.

The storage system described above can be implemented at various capacity scales including a cloud service or large scale (e.g., large corporation's) proprietary storage system, a storage area network (e.g., composed of a plurality of storage servers interconnected by a network), the storage system of a computer, etc.

FIG. 8 provides an exemplary depiction of a computing system 800. Any of the aforementioned storage systems can be constructed, e.g., from one or more computers having components of the computing system 800 of FIG. 8 including one or more non volatile mass storage devices 820 that correspond to the physical storage devices described above.

As observed in FIG. 8, the basic computing system 800 may include a central processing unit (CPU) 801 (which may include, e.g., a plurality of general purpose processing cores 815_1 through 815_X) and a main memory controller 817 disposed on a multi-core processor or applications processor, main memory 802 (also referred to as "system memory"), a display 803 (e.g., touchscreen, flat-panel), a local wired point-to-point link (e.g., universal serial bus (USB)) interface 804, a peripheral control hub (PCH) 818; various network I/O functions 805 (such as an Ethernet interface and/or cellular modem subsystem), a wireless local area network (e.g., WiFi) interface 806, a wireless point-to-point link (e.g., Bluetooth) interface 807 and a Global Positioning System interface 808, various sensors 809_1 through 809_Y, one or more cameras 810, a battery 811, a power management control unit 812, a speaker and microphone 813 and an audio coder/decoder 814.

An applications processor or multi-core processor 850 may include one or more general purpose processing cores 815 within its CPU 801, one or more graphical processing units 816, a main memory controller 817 and a peripheral control hub (PCH) 818 (also referred to as I/O controller and the like). The general purpose processing cores 815 typically execute the operating system and application software of the computing system. The graphics processing unit 816 typically executes graphics intensive functions to, e.g., generate graphics information that is presented on the display 803. The main memory controller 817 interfaces with the main memory 802 to write/read data to/from main memory 802. The power management control unit 812 generally controls the power consumption of the system 800. The peripheral control hub 818 manages communications between the computer's processors and memory and the I/O (peripheral) devices.

Each of the touchscreen display 803, the communication interfaces 804-807, the GPS interface 808, the sensors 809, the camera(s) 810, and the speaker/microphone codec 813, 814 all can be viewed as various forms of I/O (input and/or output) relative to the overall computing system including, where appropriate, an integrated peripheral device as well (e.g., the one or more cameras 810). Depending on implementation, various ones of these I/O components may be integrated on the applications processor/multi-core processor 850 or may be located off the die or outside the package of the applications processor/multi-core processor 850. The computing system also includes non-volatile mass storage 820 which may be the mass storage component of the system which may be composed of one or more non-volatile mass storage devices (e.g., hard disk drive, solid state drive, etc.). The non-volatile mass storage 820 may be implemented with any of solid state drives (SSDs), hard disk drive (HDDs), etc.

Embodiments of the invention may include various processes as set forth above. The processes may be embodied in program code (e.g., machine-executable instructions). The program code, when processed, causes a general-purpose or special-purpose processor to perform the program code's processes. Alternatively, these processes may be performed by specific/custom hardware components that contain hard interconnected logic circuitry (e.g., application specific integrated circuit (ASIC) logic circuitry) or programmable logic circuitry (e.g., field programmable gate array (FPGA) logic circuitry, programmable logic device (PLD) logic circuitry) for performing the processes, or by any combination of program code and logic circuitry.

Elements of the present invention may also be provided as a machine-readable storage medium for storing the program code. The machine-readable storage medium can include, but is not limited to, floppy diskettes, optical disks, CD-ROMs, and magneto-optical disks, FLASH memory, ROMs, RAMS, EPROMS, EEPROMs, magnetic or optical cards or other type of media/machine-readable storage medium suitable for storing electronic instructions. The program code is to be executed by one or more computers.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
    executing a PUT operation for an object in an object storage system, including sending a write to S storage devices to create S replicants of object data and first protection information for the object, and sending a write to an additional R storage devices to create an additional R replicants of the object data for the object, where the S replicants of the object data and the first protection information for the object are sufficient for a data protection policy for the object in case of a failure of one of the S storage devices, and where the additional R replicants extend protection beyond the data protection policy in the case of a failed write of the first protection information;
    determining that a write to at least one of the S storage devices was not successful; and,
    in response to determining that the write was not successful, repairing a stored state for the object by storing the object data and the first protection information in the S storage devices based on the S replicants and the R replicants.

2. The method of claim 1 wherein the first protection information comprises parity information calculated from an erasure encoding algorithm.

3. The method of claim 2 wherein the repairing further comprises generating missing information for writes that failed for the S storage devices from stored information for writes that were successful in the S storage devices and the R storage devices.

4. The method of claim 1 wherein the stored state is one of a group of states assigned to the object after attempting a PUT operation, the group of states comprising at least one of:
    a first state defined by more successful writes into the R storage devices than unsuccessful writes into the S storage devices;
    a second state defined by fewer than S successful writes into the S storage devices and R storage devices combined;
    a third state defined by S successful writes into the S storage devices.

5. The method of claim 1 further comprising attempting a next PUT operation for a different object after the determining and before the repairing.

6. The method of claim 1 wherein the repairing comprises deleting the R replicants after ensuring that all S storage devices have correct object data and first protection information.

7. The method of claim 1 wherein the R replicants include the object data and second protection information calculated based on erasure encoding.

8. One or more computer systems having a storage device with program code stored thereon that when processed by the one or more computer systems causes a method to be performed, the method comprising:
    executing a PUT operation for an object in an object storage system, including sending a write to S storage devices to create S replicants of object data and first protection information for the object, and sending a write to an additional R storage devices to create an additional R replicants of the object data for the object, where the S replicants of the object data and the first protection information for the object are sufficient for a data protection policy for the object in case of a failure of one of the S storage devices, and where the additional R replicants extend protection beyond the data protection policy in the case of a failed write of the first protection information;
    determining that a write to at least one of the S storage devices was not successful; and,
    in response to determining that the write was not successful, repairing a stored state for the object by storing the object data and the first protection information in the S storage devices based on the S replicants and the R replicants.

9. The one or more computer systems of claim 8 wherein the first protection information comprises parity information calculated from an erasure encoding algorithm.

10. The one or more computer systems of claim 9 wherein the repairing further comprises generating missing information for writes that failed for the S storage devices from stored information for writes that were successful in the S storage devices and the R storage devices.

11. The one or more computer systems of claim 8 wherein the stored state is one of a group of states assigned to the object after attempting a PUT operation, the group of states comprising at least one of:
    a first state defined by more successful writes into the R storage devices than unsuccessful writes into the S storage devices;
    a second state defined by fewer than S successful writes into the S storage devices and R storage devices combined;
    a third state defined by S successful writes into the S storage devices.

12. The one or more computer systems of claim 8 wherein the method further comprises attempting a next PUT operation for a different object after the determining and before the repairing.

13. The one or more computer systems of claim 8 wherein the repairing comprises deleting the R replicants after ensuring that all S storage devices have correct object data and first protection information.

14. The one or more computer systems of claim 8 wherein the R replicants include the object data and second protection information calculated based on erasure encoding.

15. One or more machine-readable storage media containing program code stored thereon that when processed by one or more computers causes a method to be performed, comprising:
    executing a PUT operation for an object in an object storage system, including sending a write to S storage devices to create S replicants of object data and first protection information for the object, and sending a write to an additional R storage devices to create an additional R replicants of the object data for the object, where the S replicants of the object data and the first protection information for the object are sufficient for a data protection policy for the object in case of a failure of one of the S storage devices, and where the additional R replicants extend protection beyond the data protection policy in the case of a failed write of the first protection information;
    determining that a write to at least one of the S storage devices was not successful; and,
    in response to determining that the write was not successful, repairing a stored state for the object by storing the object data and the first protection information in the S storage devices based on the S replicants and the R replicants.

16. The one or more machine-readable storage media of claim 15 wherein the first protection information comprises parity information calculated from an erasure encoding algorithm.

17. The one or more machine-readable storage media of claim 16 wherein the repairing further comprises generating missing information for writes that failed for the S storage devices from stored information for writes that were successful in the S storage devices and the R storage devices.

18. The one or more machine-readable storage media of claim 15 wherein the stored state is one of a group of states assigned to the object after attempting a PUT operation, the group of states comprising at least one of:

a first state defined by more successful writes into the R storage devices than unsuccessful writes into the S storage devices;

a second state defined by fewer than S successful writes into the S storage devices and R storage devices combined;

a third state defined by S successful writes into the S storage devices.

19. The one or more machine-readable storage media of claim 15 wherein the method further comprises attempting a next PUT operation for a different object after the determining and before the repairing.

20. The one or more machine-readable storage media of claim 15 wherein the repairing comprises deleting the R replicants after ensuring that all S storage devices have correct object data and first protection information.

21. The one or more machine-readable storage media of claim 15 wherein the R replicants include the object data and second protection information calculated based on erasure encoding.

* * * * *